Dec. 13, 1955  A. P. FITZ JOHN  2,726,773
IMPROVEMENTS IN BUFFING AND DRAW-GEAR FOR VEHICLES
Filed Oct. 31, 1950
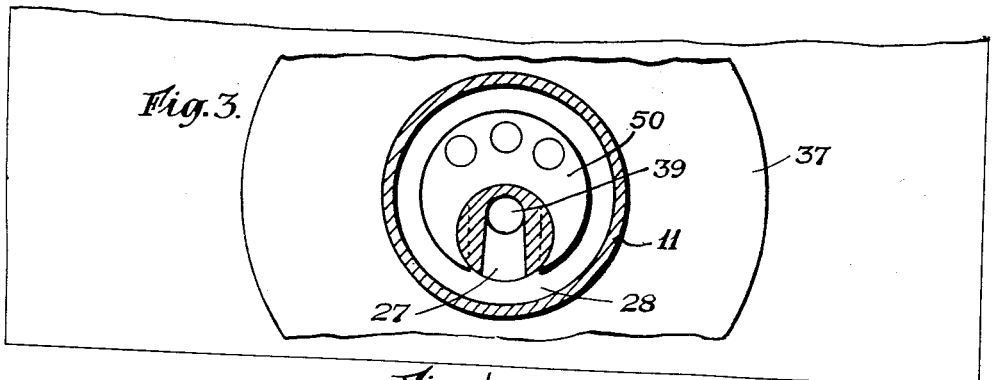
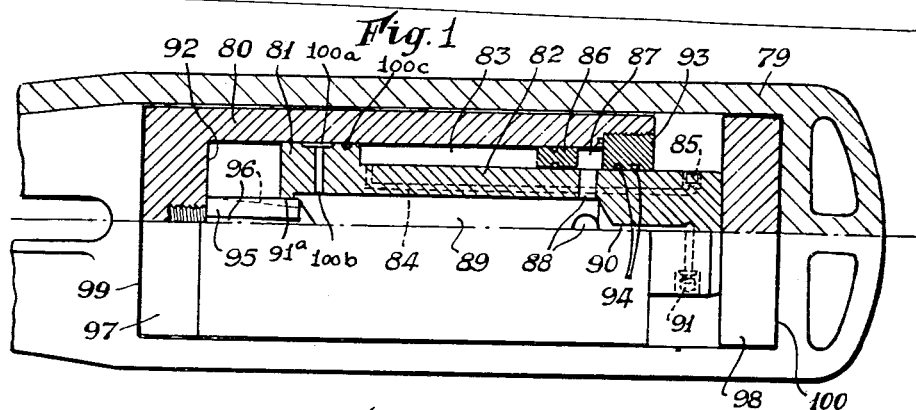
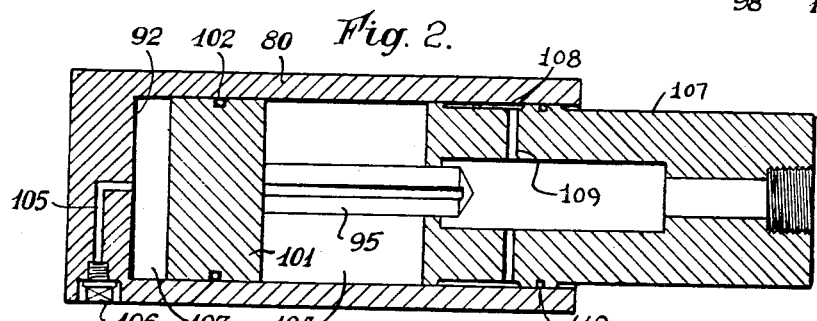
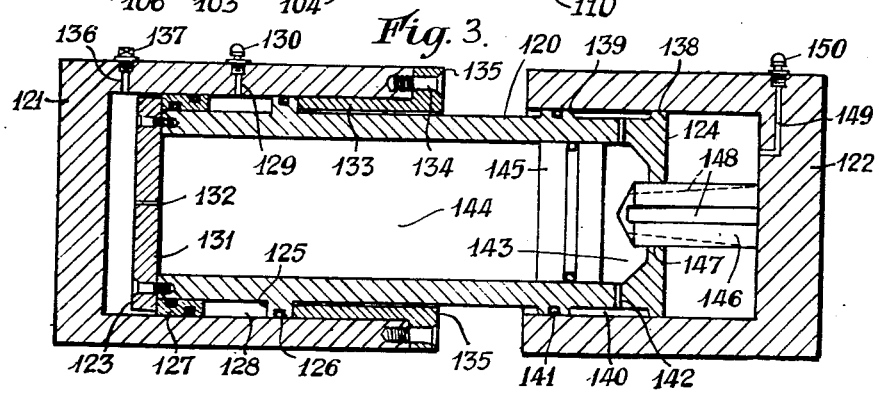
INVENTOR
A. P. Fitzjohn
By Watson, Cole, Grindle & Watson : United States Patent Office 2,726,773
Patented Dec. 13, 1955

2,726,773

IMPROVEMENTS IN BUFFING AND DRAW-GEAR FOR VEHICLES

Arthur Percy Fitzjohn, Sheffield, England, assignor of one-half to George Turton Platts & Company Limited, Wincobank, Sheffield, England, a company of Great Britain and Northern Ireland Application October 31, 1950, Serial No. 193,102

Claims priority, application Great Britain November 4, 1949

7 Claims. (Cl. 213—43)

This invention relates to buffing and draw-gear for vehicles of the kind employing a cylinder and piston for relative movement.

The invention is particularly directed to such devices in which buffing and draw shocks will be absorbed in displacing a liquid against the opposing pressure of compressed air.

An object of the invention is to provide an improved cylinder and piston assembly mounted for relative movement in a yoke or cradle which is adapted for connection to a vehicle, co-operating stop means being provided on the cylinder and piston and the vehicle to ensure movement of either the cylinder or the piston relative to the other whereby displacement of liquid from an oil filled chamber in the cylinder to an oil filled chamber in the piston is restricted to a gradually increasing degree against the opposing pressure of compressed air for cushioning the buffing or draw shocks, a member associated with the cylinder co-operating with a liquid conveying passage from one of said chambers to the other serving as the means for restricting the displacement of the liquid.

It is a further object of the invention to provide the cushioning air for the liquid in a chamber in the cylinder in which a slidable member is exposed at opposite faces to the air and liquid, said member being in sealing engagement with the cylinder and piston to seal the air from the liquid.

It is a still further object of the invention to provide air cushioning means to the member which restricts the displacement of liquid from the liquid chamber of the cylinder to the liquid chamber of the piston.

Referring to the drawings filed herewith:

Fig. 1 is a half-sectional elevation of one form of device made according to this invention.

Fig. 2 shows in sectional elevation a modified form of the device, and

Fig. 3 is a sectional elevation of a further modified form of device.

In Fig. 1 a yoke or cradle 79 which is slidably carried by a vehicle undercarriage frame (not shown), usually on the centre line of the vehicle, slidably accommodates a cylinder and piston assembly comprising a cylinder 80 and piston 81 slidable in the cylinder or over which the cylinder 80 is adapted to slide, according to direction of movement of the yoke relative to the vehicle.

The piston 81 is provided with a hollow stem 82 of reduced diameter providing an annular chamber 83, 87 between the stem and cylinder wall, the chamber portion 83 being supplied with air under pressure through a passage 84 having a non-return valve 85. The chamber portion 83 is closed at one end by the rear annular face of the piston 81 and at the other end by a floating sealing gland 86. At the rear of the gland 86 is another annular chamber portion 87 communicating by radially disposed passages 88 with the bore 89 of the piston so that oil may pass from the bore 89 to the chamber portion 87.

Oil is admitted to the piston bore 89, cylinder 80 and chamber portion 87 by passage 90 in the piston which is provided with non-return valve 91, thus providing oil filled chambers of which the chamber 89 in the piston and the chamber in the cylinder 80 have intercommunication by means of a passage 91a.

The cylinder 80 is closed at its forward end by an end wall 92 and at its rear end is provided with a closure ring 93 having sealing means 94 between it and the piston stem 82.

Carried by the cylinder 80 and projecting axially through the passage 91a and into the piston chamber 89, is a stem 95 having tapering grooves 96, said stem 95 co-operating with the passage 91a for gradually restricting displacement of oil from the cylinder 80 to the piston chamber 89.

Exteriorly of the forward end of the cylinder 80 and of the rearward end of the piston stem 82 are projecting stop members 97 and 98 respectively adapted each to co-operate with stops (not shown) on the vehicle undercarriage frame.

The device is mounted in the yoke 79 which is axially slidable in known manner in guides in the vehicle frame (not shown), with the forward end of the cylinder and the rear end of the piston stem respectively abutting the end walls 99 and 100 of the yoke so that the piston and cylinder assembly are adapted to move as a unit with the yoke until either the stop 97 or 98 engages with its co-operating stop (not shown) on the vehicle frame.

The piston 81 is provided with an oil sealing chamber 100a circumferentially between said piston and the cylinder 80 and exteriorly of the air chamber 83, said oil sealing chamber communicating with the oil chamber 89 of the piston by radial ports 100b and being sealed from the air chamber 83 by sealing ring 100c.

In use, in the case of a tractive effort being applied to the forward end of the yoke 79, the stop 97 engages the co-operating stop (not shown) on the vehicle frame and forward movement of the cylinder is arrested. Continued forward movement of the yoke carries the piston forward with it, so that said piston is urged inwardly of the cylinder by the rear end of the yoke.

Oil displaced from the cylinder 80 passes in gradually restricted extent through the grooves 96 of stem 95 into the bore 89 and thence into the annular chamber portion 87 and, when the pressure on the oil exceeds that of the air in the annular chamber portion 83, the floating gland 86 is caused thereby to move inwardly into the chamber portion 83, still further compressing the air therein.

The relative pressures on the oil and air are so arranged that the travel of the floating gland 86 is greater than that of the piston 81 so as to ensure that the air in chamber portion 83 increases its resistance to the displacement of the oil and so cause the oil in the cylinder 80 to damp the further inward movement of the piston.

In the case of a buffing shock on the forward end of the yoke, 79, said yoke moves backwards relative to the vehicle frame. The cylinder and piston assembly are also moved backwards together until the stop 98 on the end of the piston engages its co-operating stop on the vehicle frame, continued movement of the yoke moving the cylinder over the arrested piston to provide a damping effect on the yoke as above described.

In the modification shown in Fig. 2 the piston and cylinder assembly is substantially similar to that shown in Fig. 1, but instead of the stem 95 projecting axially inwardly from the end wall 92 of the cylinder 80, it is mounted on a secondary piston 101, located in the cylinder between the main piston 107 and the end wall 92 of the cylinder, and provided with sealing means 102 to divide the cylinder into two parts 103 and 104, the part 103 being filled with air under pressure through passage 105 and non-return valve 106 in the end wall 92 of the cylinder 80. The secondary piston 101 may have free sliding movement in the cylinder between the end walls 92 and the face of the main piston 107 or a sleeve (not shown) may be provided in the cylinder to limit the free sliding movement of the piston 101.

The main piston 107 is provided with sealing means for preventing escape of compressed air into the oil-containing cylinder and of oil to the compressed air chamber. Such means conveniently comprises an annular oil sealing chamber 108 communicating by passages 109 with the oil chamber 110 of the piston.

In addition to the oil sealing chamber 108 the piston 107 is provided with a sealing ring 110 exteriorly of said chamber and remote from the cylinder oil chamber 104.

Communicating with the oil chamber 110 of the piston is a compressed air chamber (not shown) which provides for opposing pressure against the oil.

In use, when the piston 107 is urged inwardly into the cylinder 80 the oil in the chamber 104 is displaced to a gradually decreasing degree into the piston oil chamber 110 against air pressure in the chamber (not shown) communicating therewith and oil is forced through the passages 109 into the oil chamber 108 thus increasing the efficiency of the seal as pressures in the oil cylinder and compressed air chamber increase.

As the oil pressure in the oil chamber 104 of the cylinder 80 builds up to a greater extent than the pressure in the piston oil chamber 110 and as no sealing ring is provided between the cylinder 80 and the oil chamber 108, oil tends to leak past the piston 107 from the cylinder as far as the oil chamber 108 so that the pressure on the oil therein rapidly becomes the same as that in the piston oil chamber 110.

In the modification shown in Fig. 3, the device consists of three cylinders 120, 121 and 122, the cylinders 121 and 122 each being slidable over the cylinder 120, the ends of which constitute pistons 123 and 124 operating respectively in the cylinders 121 and 122.

The piston 123 is formed with an integral ring 125 having a mechanical sealing ring 126 between it and the circumferential wall of the cylinder 121. A slidable annular member 127 is also provided around the piston 123 in spaced relation to the integral ring 125 to form an annular chamber 128 between the two rings and between the circumferential walls of the piston and cylinder, the annular chamber 128 being filled with liquid, such as oil, through a passage 129 in the cylinder wall, said passage being provided with a non-return filling valve 130. The annular member 127 is retained on the piston by an end plate 131 which also forms the operative face of the piston 123. A small bleed port 132 is provided through the end plate 131.

Movement of the piston 123 in the cylinder 121 is limited by a sleeve 133 secured at the open end of the cylinder by means of screws 134 passing through a flange 135 of the sleeve into the cylinder wall.

An air inlet passage 136 and non-return valve 137 therefor are mounted in the wall of the cylinder 121.

The piston 124 at the other end of the cylinder 120 is provided with two integral flanges 138, 139 spaced apart to provide between them, and between the circumferential walls of the piston and cylinder, an annular chamber 140, the flange 139 being provided with a sealing ring 141 between it and the cylinder wall. Radial passages 142 are provided between the annular chamber 140 and a chamber 143 of the cylinder separated from the chamber 144 of the cylinder by a floating piston 145.

Projecting inwardly into the cylinder 122 is a stem 146 which is also adapted to pass through an orifice 147 in the end face of piston 124, the stem 146 being provided with tapering grooves 148 adapted, as the stem passes into the chamber 143 to provide progressively reduced apertures communicating such chamber with cylinder 122.

The cylinder 122 is filled with oil through passage 149 and non-return valve 150.

The device of Fig. 3 is adapted to be housed in the yoke of a draft gear such as illustrated in Fig. 1.

In operation, when cylinders 121 and 122 are slowly forced one towards the other, the air in cylinder 121 is compressed and compressed air therefrom bleeds through passage 132 into the chamber 144, thus raising the pressures in cylinder 121 and chamber 144.

Similarly as the cylinder 122 moves over cylinder 120, the pressure on the oil in cylinder 122 rises, and some oil escapes through the tapering passages 148 in the stem 146 into chamber 143 in cylinder 120, the volume of oil escaping to chamber 143 decreasing as the stem 146 passes into the chamber 143, as the tapering passages 148 provide progressively smaller orifices for the oil. The floating piston 145 moves in the cylinder until the pressures in chambers 143 and 144 are substantially balanced.

Compression of the air in cylinder 121, and pressure of oil in the cylinder 122 is considerably greater than that of the air in chamber 144 and oil in chamber 143 respectively, owing to the restricted orifices between the cylinder 121 and chamber 144, and between the cylinder 122 and the chamber 143 respectively.

To seal the air in cylinder 121 from atomsphere, the oil-filled annular chamber 128 is provided, the compressed air in cylinder 121 acting on the member 127 to apply a pressure to the oil in the chamber 128 equal and opposite to that of the compressed air.

Any oil under pressure in cylinder 122 which may escape past the flange 138 of piston 124 passes into chamber 140, where, by reason of its communication with oil under lower pressure in the chamber 143, the pressure on the oil in chamber 140 also falls to a corresponding pressure, which is insufficient to force the oil past the sealing ring 141.

If the compression rate is rapid, the pressure buildup in cylinder 121 will be rapid since the passage 132 permits only a slow bleed of air to the chamber 144. The cylinder 120 is forced into cylinder 122 and oil passes therefrom into chamber 143 thus reducing the initial shock load on the device.

On release of load, the air cushion in cylinder 121 forces cylinder 120 to its normal inoperative position, whilst simultaneously the air in chamber 144 forces piston 145 to eject oil from chamber 143 into cylinder 122 to return cylinder 122 to its normal extended position.

What I claim and desire to secure by Letters Patent is:

1. Buffing and draw-gear for a vehicle comprising, a cylinder and a piston assembled for movement of either of said cylinder or piston with respect to the other, intercommunicating oil filled chambers in the cylinder and piston, an oil-conveying passage in the piston providing the intercommunication of said chambers, means associated with the cylinder co-operating with the piston for affording progressively increasing resistance to the displacement of oil through said passage throughout relative movement of the cylinder and piston the one towards the other, compressed air cushioning means actuable upon the oil in one of said oil filled chambers, said cushioning means comprising a third chamber communicating with the oil filled chamber to be cushioned, a movable member in said third chamber subjected on one face to the pressure of the oil in said oil filled chamber, and means for supplying air under pressure to the opposite face of said member, an oil sealing chamber circumferentially between the cylinder and the piston intermediate the ends of said piston and communicating at all times with the oil chamber in the piston, a yoke formed for attachment to a vehicle frame and slidably accommodating the cylinder and piston assembly, stop means associated with the cylinder at one end of the yoke co-operable with the vehicle for limiting movement of said cylinder on movement of the piston with the yoke, and stop means associated with the piston at the other end of the yoke co-operable with the vehicle for limiting movement of said piston on movement of the cylinder with the yoke.

2. Buffing and draw-gear for a vehicle comprising, a cylinder and a piston asembled for movement of either of said cylinder or piston with respect to the other, intercommunicating oil filled chambers in the cylinder and piston, an oil-conveying passage in the piston providing the intercommunication of said chambers, means associated with the cylinder co-operating with the piston for affording progressively increasing resistance to the displacement of oil through siad passage throughout relative movement of the cylinder and piston the one towards the other, compressed air cushioning means actuable upon the oil in one of said oil filled chambers, said cushioning means comprising a third chamber communicating with the oil filled chamber to be cushioned, a movable member in said third chamber subjected on one face to the pressure of the oil in said oil filled chamber, and means for supplying air under pressure to the opposite face of said member, and an oil sealing chamber circumferentially between the cylinder and the piston intermediate the ends of said piston and communicating at all times with the oil chamber in the piston.

3. Buffing and draw-gear for a vehicle comprising, a cylinder and a piston assembled for movement of either of said cylinder or piston with respect to the other, intercommunicating oil filled chambers in the cylinder and piston, an oil conveying passage in the piston providing the intercommunication of said chambers, means associated with the cylinder and co-operating with the piston for affording progressively increasing resistance to the displaceemnt of oil through said passage throughout relative movement of the cylinder and piston the one towards the other, an annular chamber circumferentially between the cylinder and the piston, an annular member in said chamber in slidable engagement with the piston and the cylinder and exposed to compressed air in one of said chamber and to the oil in the piston oil chamber, passages connecting the ends of said annular chamber with a source of compressed air and with said piston oil chamber, respectively, and an oil sealing chamber circumferentially between the cylinder and the piston sealed from said annular chamber and communicating at all times with the piston oil chamber.

4. Buffing and draw-gear for a vehicle comprising, a cylinder and a piston assembled for movement of either of said cylinder or piston with respect to the other, intercommunicating oil filled chambers in the cylinder and piston, an oil conveying passage in the piston providing the intercommunication of said chambers, a member secured to and movable with the cylinder and co-operating with the piston for affording progressively increasing resistance to the displacement of oil through said passage throughout relative movement of the cylinder and piston the one towards the other, an annular chamber circumferentially between the cylinder and the piston, an annular member in said annular chamber in slidable engagement with the piston and the cylinder and exposed to compressed air in one end of said chamber and to the oil in the piston oil chamber, passages connecting the ends of said annular chamber with a source of compressed air and with said piston oil chamber, respectively, means in said annular member sealing a portion of said annular chamber from said piston oil chamber, an oil sealing chamber circumferentially between the cylinder and the piston exteriorly of the annular chamber at the end thereof remote from the annular member, said oil sealing chamber communicating at all times with the piston oil chamber, and means in the piston sealing said oil sealing chamber from said annular chamber.

5. Buffing and draw-gear for a vehicle comprising, a cylinder and a piston assembled for movement of either of said cylinder or piston with respect to the other, intercommunicating oil filled chambers in the cylinder and piston, an oil conveying passage in the piston providing the intercommunication of said chambers, a member secured to and movable with the cylinder and co-operating with the piston for affording progressively increasing resistance to the displacement of oil through said passage throughout relative movement of the cylinder and piston the one towards the other, a compressed air chamber circumferentially between the cylinder and the piston, an annular member in said air chamber in slidable engagement with the piston and the cylinder and exposed to the air in said chamber and to the oil in the piston oil chamber, means in said annular member sealing said air chamber from said piston oil chamber, an oil sealing chamber circumferentially between the cylinder and the piston exteriorly of the air chamber at the end thereof remote from the annular member, said oil sealing chamber communicating at all times with the piston oil chamber, a yoke formed for attachment to a vehicle frame and slidably accommodating the cylinder and piston assembly, stop means associated with the cylinder at one end of the yoke co-operable with the vehicle for limiting movement of said cylinder on movement of the piston with the yoke, and stop means associated with the piston at the other end of the yoke co-operable with the vehicle for limiting movement of said piston on movement of the cylinder with the yoke.

6. Buffing and draw-gear for a vehicle, comprising, a cylinder and a piston assembled for movement of either of said cylinder or piston with respect to the other, intercommunicating oil filled chambers in the cylinder and piston, an oil conveying passage in the piston providing the intercommunication of said chambers, an air cushioned member in the cylinder co-operating with the piston for affording progressively increasing resistance to the displacement of oil through said passage throughout relative movement of the cylinder and piston the one towards the other, a compressed air chamber in communication with the piston oil chamber and providing air pressure upon the oil therein, and an oil sealing chamber circumferentially between the cylinder and the piston and communicating at all times with the piston oil chamber.

7. Buffing and draw-gear for a vehicle comprising, a pair of outer cylinders separately slidable over an inner cylinder, the ends of said inner cylinder constituting pistons one each in said outer cylinders and one of said outer cylinders and an adjacent piston end of the inner cylinder providing intercommunicating oil filled chambers, an oil conveying passage in said piston end providing the intercommunication of the oil filled chamber thereof with the oil filled chamber of the cylinder, a member associated with the cylinder having the oil filled chamber co-operating with said oil conveying passage for affording progressively increasing resistance to the displacement of oil through said passage throughout relative movement of said cylinder and said piston end the one towards the other, compressed air cushioning means actuable upon the oil in the oil filled chamber of said piston end, said cushioning means comprising a further chamber adjacent the oil filled chamber of said piston end, a movable member separating said two last mentioned chambers and subjected on one face to the pressure of the oil in said oil filled chamber, and means for supplying air under pressure to the opposite face of said movable member, and an oil sealing chamber circumferentially between said piston end and the cylinder having the oil filled chamber, said oil sealing chamber communicating at all times with the oil chamber in the piston end.

References Cited in the file of this patent

UNITED STATES PATENTS

| | | |
|---|---|---|
| 635,848 | Dutton | Oct. 31, 1899 |
| 770,537 | Raders | Sept. 20, 1904 |

(Other references on following page)

UNITED STATES PATENTS

| | | |
|---|---|---|
| 1,437,605 | Monton | Dec. 5, 1922 |
| 1,519,451 | Harris | Dec. 16, 1924 |
| 1,772,387 | Dickerson | Aug. 5, 1930 |
| 1,785,899 | Hallett | Dec. 23, 1930 |
| 1,955,349 | Stevens | Apr. 17, 1934 |
| 2,266,691 | Mercier | Dec. 16, 1941 |
| 2,342,381 | Thornhill | Feb. 22, 1944 |

FOREIGN PATENTS

| | | |
|---|---|---|
| 413,222 | Germany | Nov. 16, 1925 |
| 303,141 | Great Britain | July 18, 1929 |
| 632,497 | Great Britain | Nov. 28, 1949 |
| 259,195 | Switzerland | June 16, 1949 |